United States Patent
Imayama

(10) Patent No.: US 8,558,979 B2
(45) Date of Patent: Oct. 15, 2013

(54) LIQUID CRYSTAL DISPLAY DEVICE

(75) Inventor: Hirotaka Imayama, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 13/296,258

(22) Filed: Nov. 15, 2011

(65) Prior Publication Data

US 2012/0127409 A1 May 24, 2012

(30) Foreign Application Priority Data

Nov. 18, 2010 (JP) ................................. 2010-258276

(51) Int. Cl.
*G02F 1/1343* (2006.01)

(52) U.S. Cl.
USPC ......................................................... 349/141

(58) Field of Classification Search
None
See application file for complete search history.

(56) References Cited

U.S. PATENT DOCUMENTS

2007/0216841 A1 * 9/2007 Konno .......................... 349/141

FOREIGN PATENT DOCUMENTS

| JP | 2006337888 A | * 12/2006 |
| JP | 2009-222829 | 10/2009 |
| JP | 2009-288604 | 12/2009 |

* cited by examiner

*Primary Examiner* — Thanh-Nhan P Nguyen
(74) *Attorney, Agent, or Firm* — Antonelli, Terry, Stout & Kraus, LLP.

(57) ABSTRACT

Provided is a liquid crystal display device including: a thin film transistor substrate; a counter substrate which is arranged to face the thin film transistor substrate in an opposed manner; and a liquid crystal layer sandwiched between the thin film transistor substrate and the counter substrate, wherein the thin film transistor substrate includes a first electrode and a second electrode for applying an electric field in a substrate in-plane direction, the first electrode includes a plurality of strip portions which extend in a predetermined direction, and a chiral dopant which imparts the rotation in a direction opposite to a rotational direction of liquid crystal induced by an electric field applied between the strip portions and the second electrode is added to the liquid crystal layer.

8 Claims, 9 Drawing Sheets

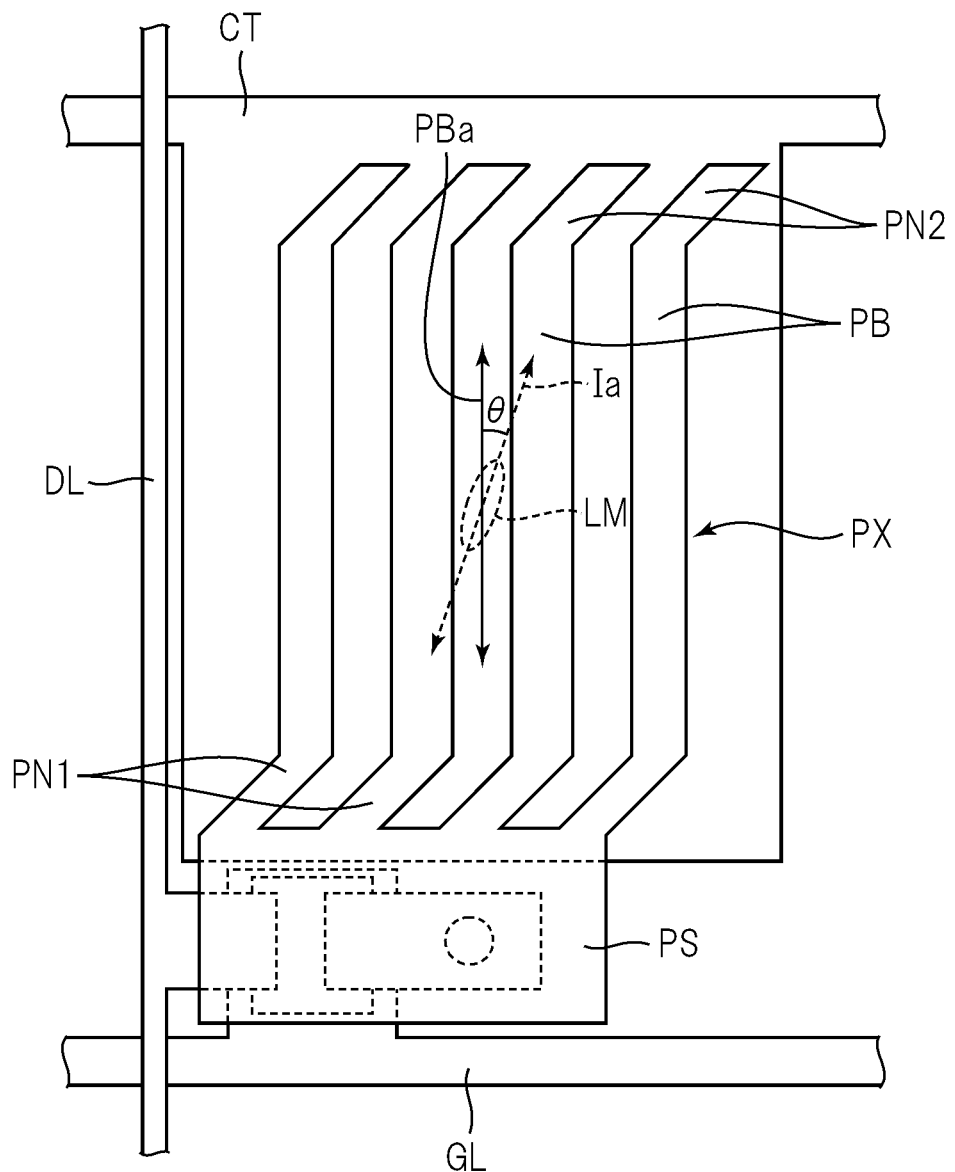

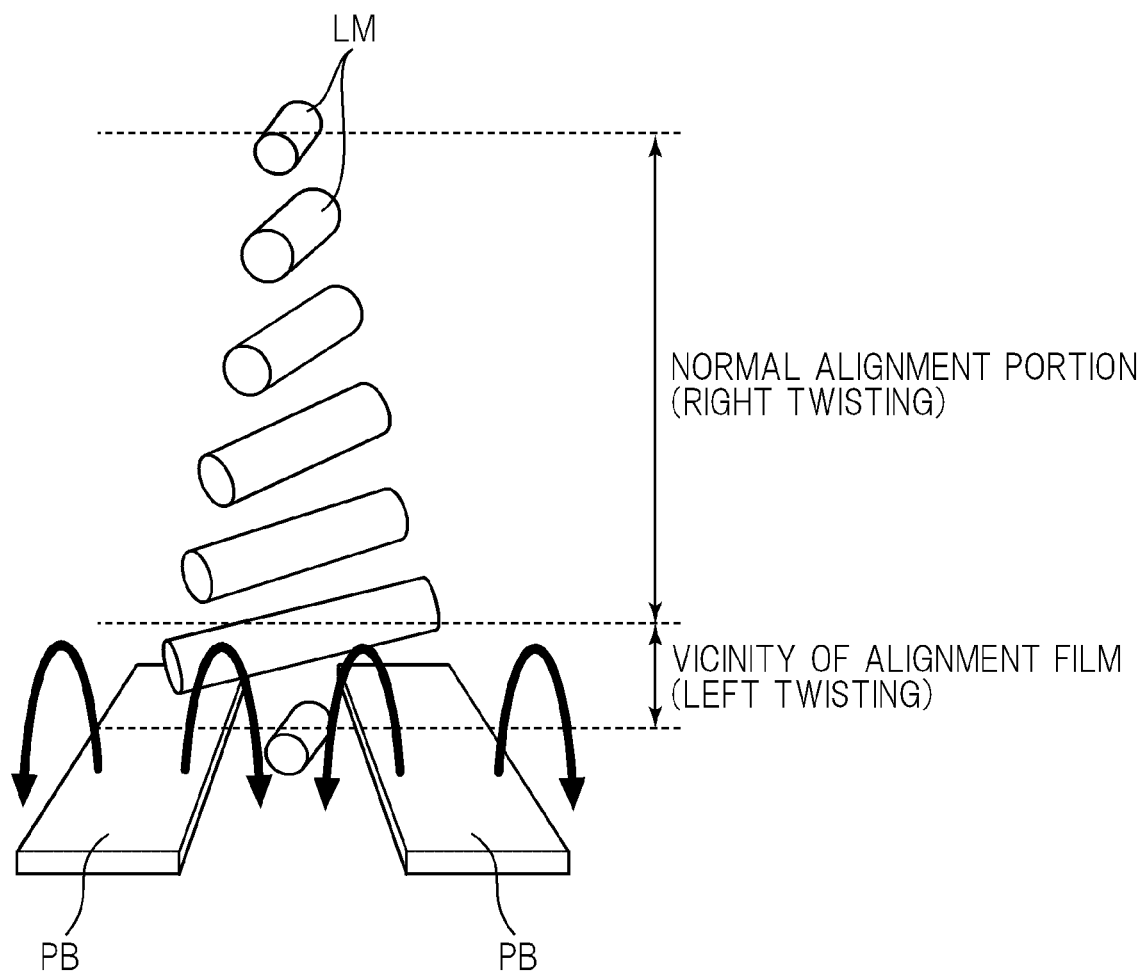

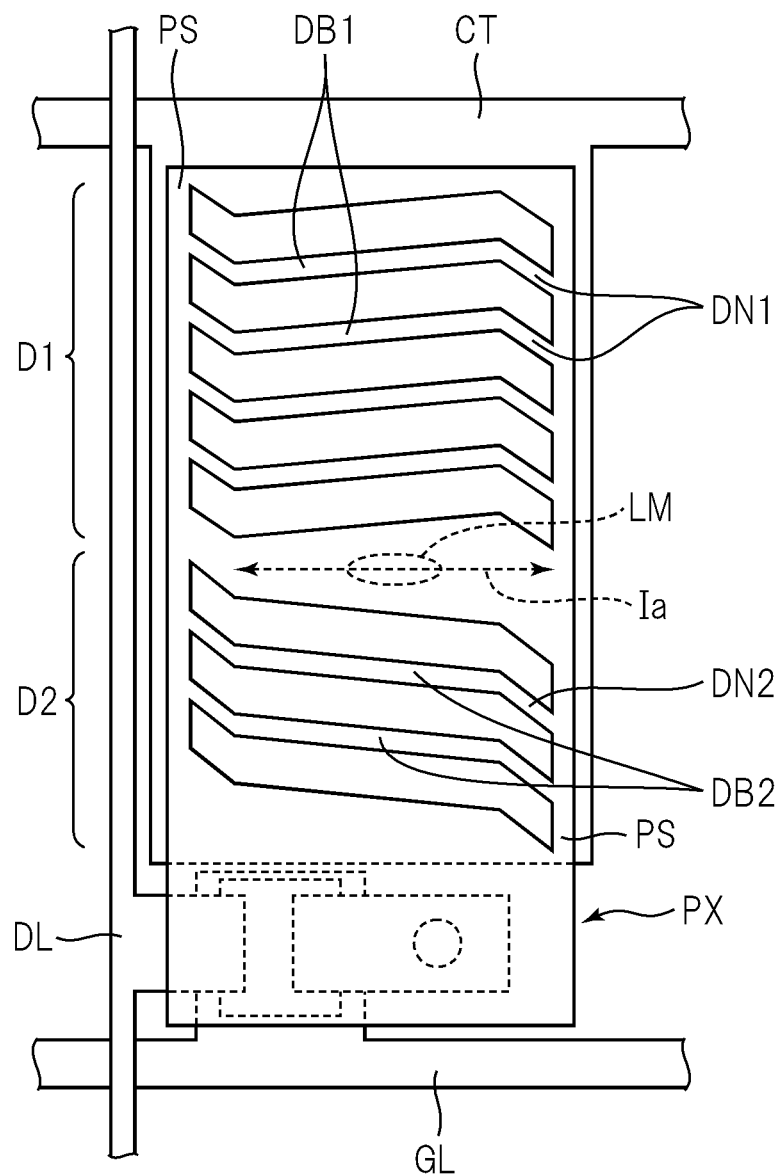

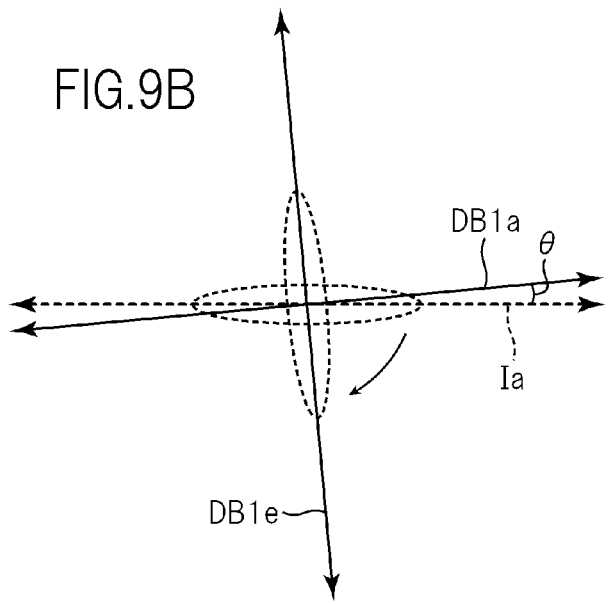
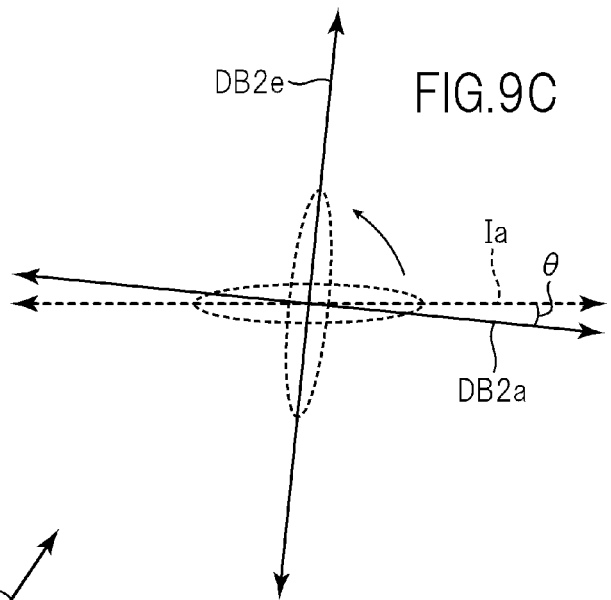
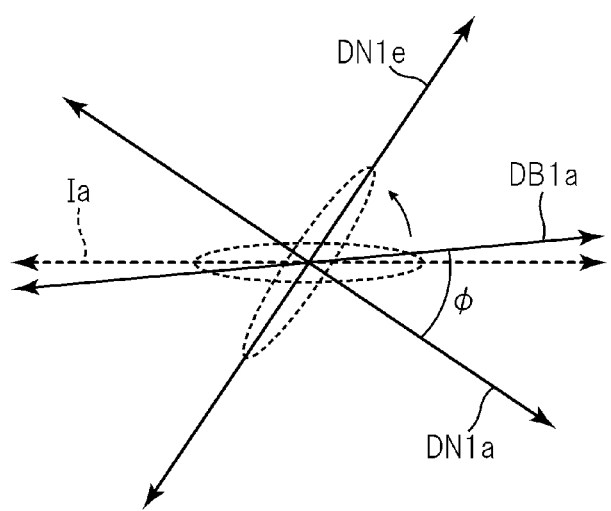

LIQUID CRYSTAL DISPLAY DEVICE

CROSS-REFERENCE TO RELATED APPLICATION

The present application claims priority from Japanese application JP 2010-258276 filed on Nov. 18, 2010, the content of which is hereby incorporated by reference into this application.

BACKGROUND OF THE INVENTION

1. Field of the Invention

The present invention relates to a liquid crystal display device.

2. Description of the Related Art

As one of drive methods of a liquid crystal display device, there has been known an In Plane Switching method where liquid crystal molecules are rotated laterally by applying an electric field to a liquid crystal layer in an in-plane direction of substrates which sandwich the liquid crystal layer therebetween.

JP 2009-222829 A discloses a direction along which liquid crystal molecules are rotated when an electric field is generated between a strip portion and a second electrode in an In-Plane-Switching liquid crystal display device. JP 2009-222829 A also discloses that a chiral dopant which imparts the rotation in the same direction as the rotation of the liquid crystal molecules to the liquid crystal molecules is added to a liquid crystal layer.

SUMMARY OF THE INVENTION

It is an object of the invention to provide a liquid crystal display device adopting an In Plane Switching method which can enhance transmissivity of pixels on the liquid crystal panel at the time of performing a white display.

To overcome the above-mentioned drawbacks, according to one aspect of the invention, there is provided a liquid crystal display device including: a thin film transistor substrate; a counter substrate which is arranged to face the thin film transistor substrate in an opposed manner; and a liquid crystal layer sandwiched between the thin film transistor substrate and the counter substrate, wherein the thin film transistor substrate includes a first electrode and a second electrode for applying an electric field in a substrate in-plane direction, the first electrode includes a plurality of strip portions which extend in a predetermined direction, and a chiral dopant which imparts the rotation in a direction opposite to a rotational direction of liquid crystal induced by an electric field applied between the strip portions and the second electrode is added to the liquid crystal layer.

According to one mode of the liquid crystal display device according to the invention, the first electrode may further include bent portions which are bent from the strip portions and extend in a direction different from the predetermined direction, a direction of initial alignment direction of liquid crystal molecules in the liquid crystal layer may be inclined by an angle $\theta$ ($0°<\theta<90°$) with reference to the strip portions, and a direction that the bent portions extend may be inclined by an angle $\phi$ ($0°<\phi<90°$) with reference to the strip portions on the same side as a side where the initial alignment direction is inclined.

According to another mode of the liquid crystal display device according to the invention, the angle $\phi$ that the bent portions are inclined with reference to the strip portions may be set larger than the angle $\theta$ that the initial alignment direction is inclined with reference to the strip portions.

According to another mode of the liquid crystal display device according to the invention, the first electrode may further include a trunk portion to which the plurality of strip portions are connected respectively, and the bent portions may be arranged between the strip portions and the trunk portion.

According to another mode of the liquid crystal display device according to the invention, the first electrode may further include a trunk portion to which the plurality of strip portions are connected respectively, and the bent portions may be arranged on edge portions of the strip portions on a side opposite to a side where the strip portions are connected to the trunk portion.

According to another mode of the liquid crystal display device according to the invention, a length that the strip portions extend in the predetermined direction may be set larger than a length that the bent portions extend in the direction different from the predetermined direction.

According to another mode of the liquid crystal display device according to the invention, the plurality of strip portions may be a plurality of first strip portions, the first electrode may include a plurality of second strip portions which extends in a predetermined direction different from the first strip portions, and a trunk portion which is connected to the respective first strip portions and the respective second strip portions, and a direction of an initial alignment direction of liquid crystal molecules in the liquid crystal layer may be inclined by an angle $\theta$ ($0°<\theta<90°$) with reference to the first strip portions, a direction that the second strip portions extend may be inclined toward a side opposite to a side that the first strip portions are inclined with reference to the initial alignment direction, and a region to which an electric field is applied by the plurality of first strip portions and the second electrode may be set larger than a region to which an electric field is applied by the plurality of second strip portions and the second electrode.

According to another mode of the liquid crystal display device according to the invention, the first electrode may further include first bent portions which are bent from the first strip portions and extend in a direction different from the predetermined direction, and a direction that the first bent portions extend may be inclined by an angle $\phi$ ($0°<\phi<90°$) with reference to the first strip portions on the same side as a side where the initial alignment direction is inclined.

According to the invention, transmissivity of pixels on the liquid crystal panel at the time of performing a white display is enhanced in the In-Plane-Switching liquid crystal display device.

BRIEF DESCRIPTION OF THE DRAWINGS

FIG. 3A is an enlarged plan view showing a pixel region of the thin film transistor substrate according to the first embodiment;

FIG. 4 is a view for explaining a state where a group of liquid crystal molecules is rotated by a lateral electric field;

FIG. 9A is an enlarged plan view of a pixel region of a thin film transistor substrate according to a fourth embodiment;

FIG. 9B is a view for explaining rotation of liquid crystal molecules in a pixel region shown in FIG. 9A;

FIG. 9C is a view for explaining rotation of the liquid crystal molecules in the pixel region shown FIG. 9A; and FIG. 9D is a view for explaining rotation of the liquid crystal molecules in the pixel region shown in FIG. 9A.

DETAILED DESCRIPTION OF THE INVENTION

Liquid crystal display devices according to embodiments of the invention are explained in conjunction with drawings hereinafter.

[First Embodiment]

Figure 1:
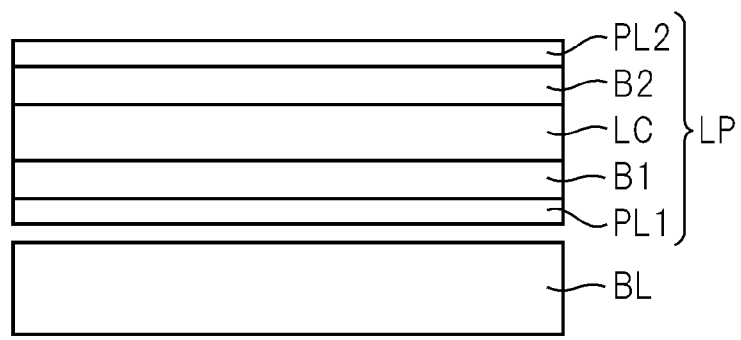
FIG. 1 is a view showing the schematic constitution of a liquid crystal display device according to a first embodiment of the invention.

FIG. 1 is a view showing the schematic constitution of the liquid crystal display device according to the first embodiment of the invention. The liquid crystal display device according to this embodiment is an In-Plane-Switching liquid crystal display device, and includes a liquid crystal panel LP and a backlight BL as constitutional parts.

The liquid crystal panel LP includes a thin film transistor substrate B1, a counter substrate B2, and a liquid crystal layer LC sandwiched between these substrates. The thin film transistor substrate B1 and the counter substrate B2 are provided with a lower polarizer PL1 and an upper polarizer PL2 respectively on a side thereof opposite to a side where the liquid crystal layer LC is arranged. The lower polarizer PL1 and the upper polarizer PL2 are arranged such that a transmission axis of the lower polarizer PL1 and a transmission axis of the upper polarizer PL2 become orthogonal to each other, and light irradiated from the backlight BL is incident on the liquid crystal layer LC through the lower polarizer PL1.

Figure 2:
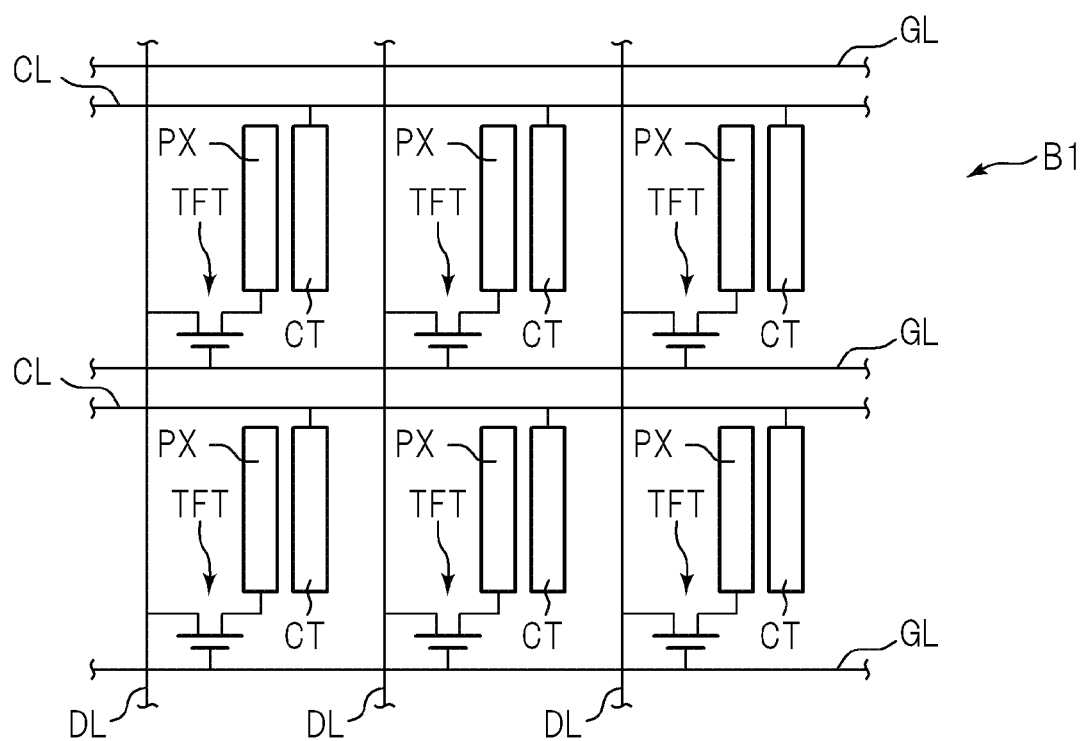
FIG. 2 is a circuit diagram showing an equivalent circuit on a thin film transistor substrate of the liquid crystal display device according to the first embodiment.

Next, FIG. 2 is an equivalent circuit diagram of the thin film transistor substrate B1 of the liquid crystal display device according to this embodiment.

As shown in FIG. 2, on the thin film transistor substrate B1, a large number of scanning signal lines GL extend in the lateral direction in the drawing at equal intervals respectively, and a large number of video signal lines DL extend in the longitudinal direction in the drawing at equal intervals respectively. Pixel regions which are arranged in a matrix array are respectively defined by these scanning signal lines GL and the video signal lines DL. Common signal lines CL extend in the lateral direction in the drawing parallel to the respective scanning signal lines GL.

A thin film transistor having the MIS (Metal-Insulator-Semiconductor) structure is formed at a corner of the pixel region defined by the scanning signal line GL and the video signal line DL, a gate electrode of the thin film transistor is connected to the scanning signal line GL, and a drain electrode of the thin film transistor is connected to the video signal line DL. A first electrode PX and a second electrode CT are formed in each pixel region. In this embodiment, the first electrode PX is a pixel electrode connected to a source electrode ST of the thin film transistor TFT, and the second electrode CT is a common electrode connected to the common signal line CL.

In the above-mentioned circuit constitution, a pixel row is selected when a gate voltage is applied to the scanning signal line GL, and a video signal is supplied to the respective video signal lines DL at such selection timing. A reference voltage is applied to the second electrode CT of each pixel through the common signal line CL. By applying a voltage of the video signal to the first electrode PX, a lateral electric field having intensity corresponding to the potential difference is generated between the first electrode PX and the second electrode CT.

Figure 3B:
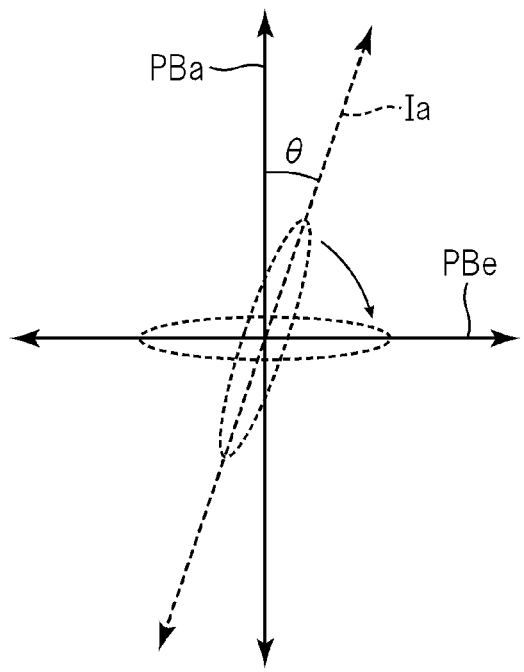
FIG. 3B is a view for explaining rotation of liquid crystal molecules in the pixel region shown in FIG. 3A.
Figure 3C:
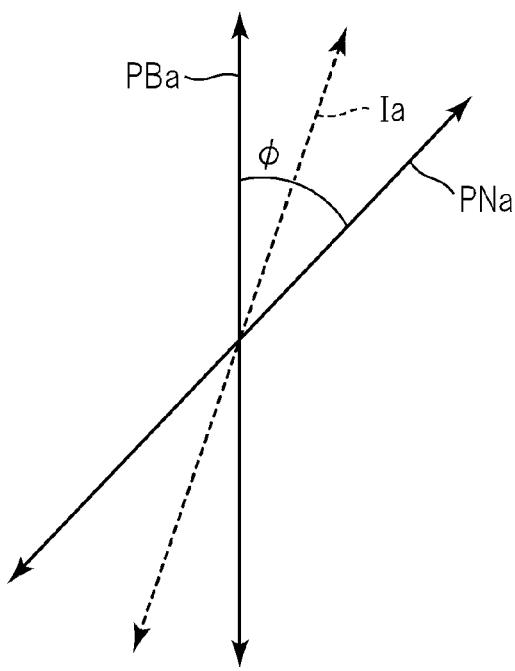
FIG. 3C is a view for explaining rotation of liquid crystal molecules in the pixel region shown in FIG. 3A.
Figure 3D:
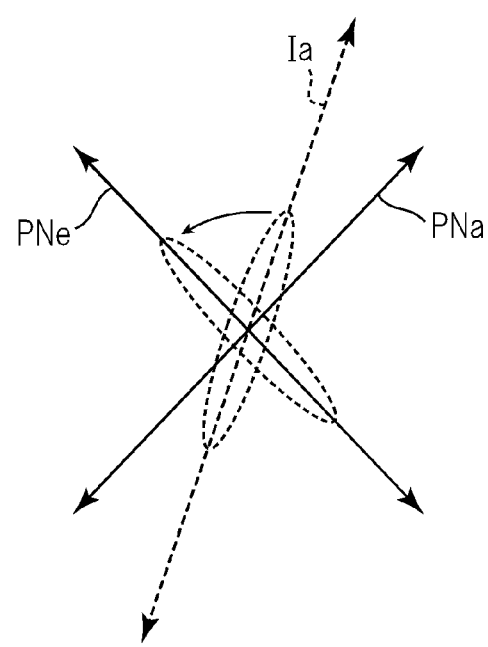
FIG. 3D is a view for explaining rotation of liquid crystal molecules in the pixel region shown in FIG. 3A.

FIG. 3A is an enlarged plan view of one pixel region of the thin film transistor substrate B1 according to this embodiment, and is also a view of the thin film transistor substrate B1 as viewed from a side where the liquid crystal layer LC is arranged. FIG. 3B to FIG. 3D are views for specifically explaining the rotation of a liquid crystal molecule LM in a state shown in FIG. 3A which is the enlarged plan view of the pixel region.

In this embodiment, the first electrode PX has a plurality of strip portions PB which extend in a predetermined direction in a strip shape and, further, includes bent portions PN1, PN2 which extend from the respective strip portions PB in a bent shape, and a trunk portion PS. In this embodiment, the plurality of strip portions PB are formed into an approximately straight-line shape such that the strip portions PB pass an intermediate location between two scanning signal lines GL arranged adjacent to each other, and the plurality of strip portions PB extend in a direction parallel to the video signal lines DL. The second electrode CT has a planar shape and is arranged on a side below the first electrode PX (on a side where the backlight BL is arranged).

An alignment film not shown in the drawing is formed on an interface between the thin film transistor substrate B1 and the liquid crystal layer LC and on an interface between the counter substrate B2 and the liquid crystal layer LC, and an initial alignment direction of liquid crystal molecules LM of the liquid crystal layer LC is defined by these alignment films. An initial alignment direction Ia extends, as shown in FIG. 3A and FIG. 3B, in a direction inclined by an angle θ (0°<θ<90°) with respect to a direction PBa along which the strip portions PB extend. To be more specific, the initial alignment direction Ia is inclined in the clockwise direction as viewed from a counter substrate B2 side with reference to the strip portions PB, and the initial alignment direction Ia makes an acute angle in the clockwise direction with reference to the strip portions PB. The alignment film on a thin film transistor substrate B1 side and an alignment film on a counter substrate B2 side are subjected to alignment treatment in the same direction as viewed in a plan view. These alignment films may be formed of an alignment film to which alignment treatment is applied by rubbing or may be formed of a light alignment film. Further, in the liquid crystal display device according to this embodiment, a transmission axis of the lower polarizer PL1 extends in a direction which substantially follows the direction of the initial alignment direction Ia thus providing a normally-black-type liquid crystal display device which performs a black display when a voltage is not applied to the liquid crystal layer LC.

The liquid crystal layer LC has homogeneously-arranged liquid crystal molecules LM, and liquid crystal molecules LM are nematic liquid crystal having positive dielectric anisotropy. The strip portions PB and the second electrode CT induce a lateral electric field in a direction PBe perpendicular to an extending direction PBa of the strip portions PB. The liquid crystal molecules LM are rotated from the initial alignment state to correspond to intensity of the lateral electric field. FIG. 3A schematically shows a state of the liquid crystal molecules LM when a voltage is not applied to the liquid crystal layer LC, wherein a long axis of a molecule of the liquid crystal molecules LM exists along the initial alignment direction Ia. When a lateral electric field is induced between the strip portions PB and the second electrode CT, as shown in FIG. 3B, the liquid crystal molecules LM are rotated in the clockwise direction as viewed from a counter substrate B2 side (hereinafter also referred to as the right twisting direction in this specification).

In this embodiment, particularly, a chiral dopant which imparts a rotation opposite to the rotation of the liquid crystal molecules LM induced by a lateral electric field applied between the strip portions PB and the second electrode CT to the liquid crystal molecules LM is added to the liquid crystal layer LC. That is, in the case of this embodiment, the initial alignment direction Ia is inclined in the clockwise direction with reference to the extending direction PBa of the strip portions PB so that the liquid crystal molecules LM are rotated in the right twisting direction due to a lateral electric field from the strip portions PB and hence, a chiral dopant which imparts the rotation in the counterclockwise direction (hereinafter also referred to as left twisting direction in this specification) as viewed from the counter substrate B2 side is added to the liquid crystal layer LC.

FIG. 4 shows a state where a group of liquid crystal molecules LM is rotated in the right twisting direction due to a lateral electric field applied between the strip portions PB and the second electrode CT. As shown in the drawing, when a right twisting spiral is generated in a normal alignment portion away from the alignment film, a left twisting spiral is generated in the vicinity of the alignment film on a thin film transistor substrate B1 side. It is considered that when a chiral dopant which imparts the left twisting rotation is added to the liquid crystal layer LC as in the case of this embodiment, left twisting stress generated in the vicinity of the alignment film on a thin film transistor substrate B1 side is alleviated. Accordingly, it is considered that the rotation of the group of liquid crystal molecules LM in the normal alignment portion when a lateral electric field is induced from the strip portions PB can be increased thus enhancing transmissivity at the time of performing a white display.

Figure 5:
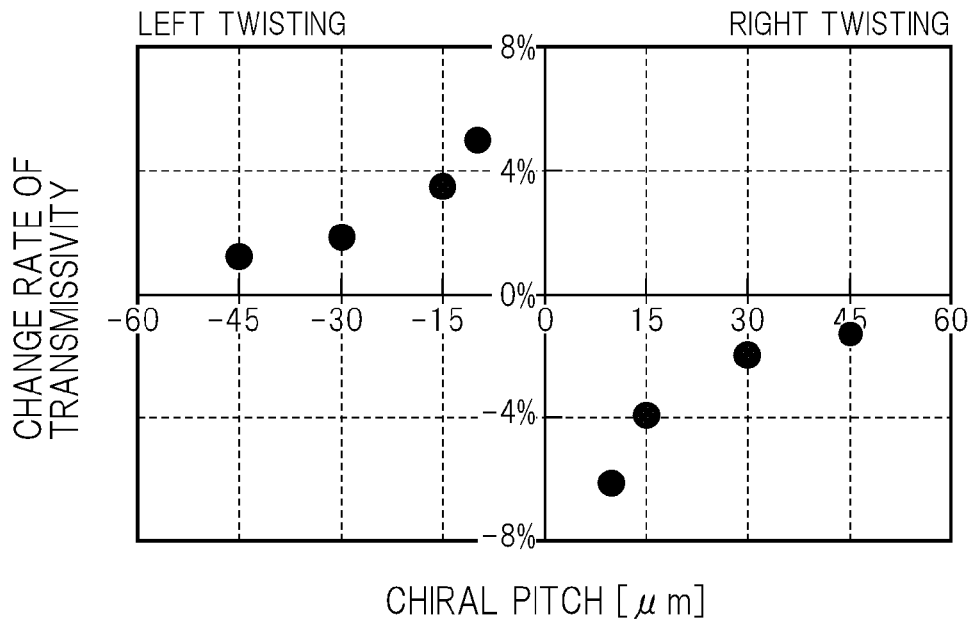
FIG. 5 is a graph showing change in transmissivity at the time of performing a white display on a liquid crystal panel when a chiral dopant which imparts right twisting and left twisting to liquid crystal molecules is added to a liquid crystal layer in a liquid crystal display device where each pixel includes strip portions shown in FIG. 3A.

FIG. 5 is a graph showing a change in transmissivity at the time of performing a white display on the liquid crystal panel when a chiral dopant which imparts right twisting or left twisting is added to the liquid crystal layer LC in the liquid crystal display device which has the plurality of strip portions PB shown in FIG. 3A in each pixel. In FIG. 5, a chiral pitch (μm) which is one cycle of twisting of a group of liquid crystal molecules LM is taken on an axis of abscissas, and a positive side is defined as right twisting and a negative side is defined as left twisting. On the other hand, a change amount of transmissivity at the time of performing a white display is taken on an axis of ordinates in FIG. 5. The change amount of transmissivity when a chiral dopant is added to the liquid crystal layer LC is expressed by percentage with reference to transmissivity when the chiral dopant is not added to the liquid crystal layer LC. When an addition amount of the chiral dopant becomes zero on the axis of abscissas in FIG. 5, no twisting exists and hence, this case corresponds to a case where a chiral pitch is infinite. Accordingly, the chiral pitch approaches zero along with the increase of an addition amount of the chiral dopant.

As described in graph shown in FIG. 5, by adding a left twisting chiral dopant to the liquid crystal layer LC, transmissivity at the time of performing a white display on the liquid crystal panel LP is enhanced. Accordingly, by adding a chiral dopant which imparts the rotation in the direction opposite to the direction of the rotation of liquid crystal molecules LM induced by an electric field applied between the strip portions PB and the second electrode CT, transmissivity at the time of performing a white display of pixels on the liquid crystal panel LP can be enhanced. The principle which is considered to be the reason that transmissivity at the time of performing a white display is enhanced with the addition of a chiral dopant which imparts left twisting is explained in conjunction with FIG. 4. However, it is needless to say that even if the enhancement of transmissivity at the time of performing a white display is derived from the different principle, the technique is within the scope of the invention.

In this embodiment, transmissivity at the time of performing a white display is enhanced by adding a chiral dopant which imparts left twisting to the liquid crystal layer LC as described above. However, when such a chiral dopant is added to the liquid crystal layer LC, a voltage generated in a pushed domain is lowered. Here, "pushed domain" means disturbance of alignment which occurs when the liquid crystal panel LP is pushed by a finger or the like and is a state where the disturbance of alignment is maintained for a while even when an electric field is applied to a liquid crystal layer.

Figure 6:
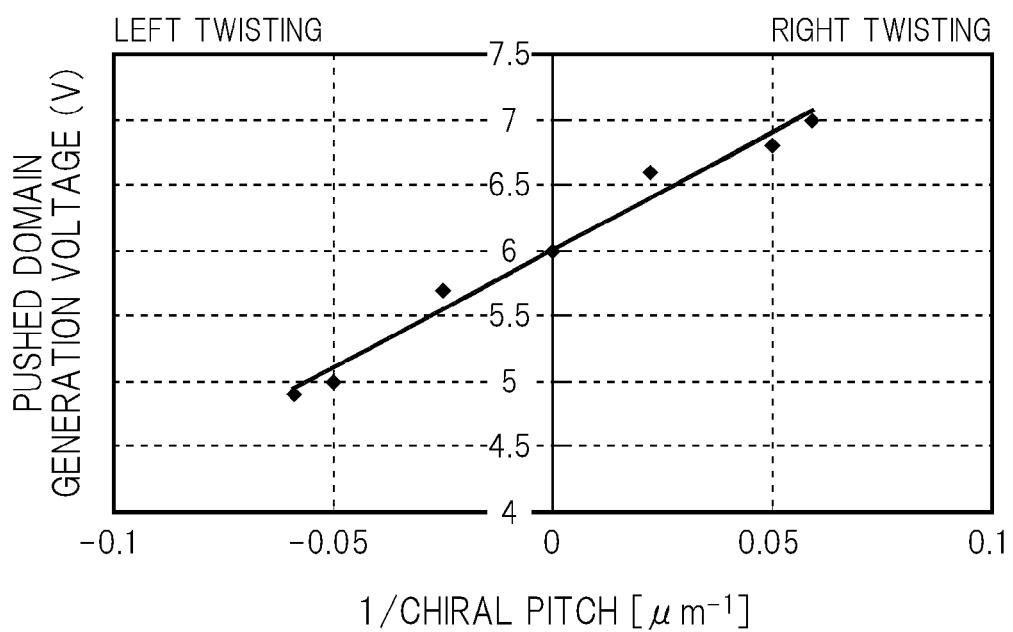
FIG. 6 is a graph for explaining the relationship between a chiral pitch and pushed domain generation voltage.

FIG. 6 is a graph for explaining the relationship between a chiral pitch and a pushed domain generation voltage, wherein respective voltages at which a pushed domain is liable to be generated are plotted. In the graph shown in FIG. 6, the inverse number of the chiral pitch is taken on an axis of abscissas, and voltage is taken on an axis of ordinates. When a chiral dopant is not added to a liquid crystal layer, the chiral pitch becomes infinite and the value on the axis of abscissas becomes zero. On the other hand, when an addition amount of a chiral dopant which imparts right twisting (or left twisting) is increased, the value of 1/chiral pitch in the positive direction (or in the negative direction) is increased. As described in the graph shown in FIG. 6, when a chiral dopant which imparts left twisting is added to a liquid crystal layer, a pushed domain is liable to be generated at a lower voltage compared to a case where a chiral dopant which imparts right twisting is added to the liquid crystal layer.

In view of the above, according to this embodiment, as shown in FIG. 3A, the first electrode PX further includes the bent portions PN1, PN2 which extend from the strip portions PB in a bent shape. As shown in the drawing, the bent portions PN1 are arranged between the respective strip portions PB and the trunk portion PS, while the bent portions PN2 are arranged one end portions of the respective strip portions PB on a side where the respective strip portions PB are not connected with the trunk portion PS. Further, as shown in FIG. 3C, a direction PNa along which the bent portions PN1, PN2 extend is the direction inclined by an angle φ (0°<φ<90°) with reference to the strip portions PB on the same side as a side where the initial alignment direction Ia is inclined, and extends in the direction different from the direction of the strip portions PB.

FIG. 3D shows the direction PNa along which the bent portions PN1, PN2 extend, a direction PNe of a lateral electric field applied by the bent portions PN1, PN2 and the second electrode CT, and the initial alignment direction Ia. In this embodiment, a chiral dopant which induces the left twisting rotation is added to the liquid crystal layer LC and, further, as shown in FIG. 3C and FIG. 3D, the bent portions PN1, PN2 are inclined such that the direction PNe of the lateral electric field makes an acute angle in the left twisting direction with respect to the initial alignment direction Ia. Accordingly, the left twisting rotation is liable to be induced in the group of liquid crystal molecules LM in the periphery of the bent portions PN1, PN2. That is, in the bent portions PN1 and PN2, the rotation in the direction opposite to the rotational direction generated in the strip portions PB is induced. While the rotational direction of liquid crystal molecules LM generated in the strip portions PB is the clockwise direction, the rotational direction induced by the bent portions PN1 is the counterclockwise direction.

It is considered that the pushed domain is generated by the fact that the disturbance of alignment generated in the trunk portion PS or the like which is a portion where a lateral electric field in the direction perpendicular to a lateral electric field which the strip portions PB generate is generated is maintained so that the disturbance of alignment grows toward the inside of the pixel region. In view of the above, as in the case of this embodiment, by arranging the bent portions PN1, PN2 at the proximal portion and the end portion of the strip portions PB where the disturbance of alignment is liable to occur, even when the disturbance of alignment occurs, the disturbance can be easily eliminated and hence, the generation of the pushed domain is reduced.

Further, in this embodiment, as shown in FIG. 3A, FIG. 3C or the like, the angle $\phi$ at which the bent portions PN1, PN2 are inclined with reference to the direction PBa along which the strip portions PB extend is set larger than the angle $\theta$ at which the initial alignment direction Ia is inclined. As shown in FIG. 3D, the direction PNe of an electric field generated by the bent portions PN1, PN2 becomes perpendicular to the direction PNa along which the bent portions extend and hence, an angle which the direction PNe of the electric field makes with respect to the initial alignment direction Ia in the counterclockwise direction becomes smaller than 90 degrees. Accordingly, in the vicinity of the bent portions PN1, the left twisting rotation is induced in a group of liquid crystal molecules LM more easily and hence, the provision of the bent portions PN1 is preferable for realizing the reduction of the pushed domain.

Although it is preferable to form both the bent portions PN1 and the bent portions PN2 adjacent to the strip portions PB as in the case of this embodiment, the pushed domain can be reduced even when either one of the bent portions PN1, PN2 is formed. Further, in this embodiment, the bent portions PN1, PN2 extend in the same direction PNa. However, the bent portions PN1, PN2 may extend in directions different from each other, or the bent portions PN1, PN2 may extend while changing an angle or a width thereof in a gradually meandering shape, for example. Further, although the bent portions PN1, PN2 are arranged adjacent to each strip portion PB in this embodiment, the generation of the pushed domain can be reduced even when either one of bent portions PN1, PN2 is formed on at least one strip portion PB.

As described above, the first electrode PX of this embodiment includes the plurality of strip portions PB, the plurality of bent portions PN1, PN2 and one trunk portion PS. The strip portions PB form portions where a main lateral electric field which becomes necessary for controlling transmissivity of the pixel is generated. A length that the strip portion PB extends in a predetermined direction is set larger than a length that one or two bent portions which are formed contiguously with the strip portion PB extend. The trunk portion PS forms a portion to which the plurality of strip portions PB are connected by way of the bent portions PN1, and in this embodiment, the trunk portion PS is connected to the thin film transistor through a contact hole as shown in FIG. 3A. The respective strip portions PB are electrically connected with the thin film transistor through the trunk portion PS.

The angle at which the initial alignment direction Ia is inclined with respect to the strip portions PB is preferably set to a value which falls within a range of $1° \leq \theta \leq 30°$, and is more preferably set to a value which falls within a range of $5° \leq \theta \leq 10°$. The angle at which the bent portions PN1, PN2 are inclined with respect to the strip portions PB is preferably set to a value which falls within a range of $20° \leq \theta \leq 60°$, and is more preferably set to a value which falls within a range of $30° \leq \theta \leq 45°$.

In this embodiment, the first electrode PX forms the pixel electrode and the second electrode CT forms the common electrode. However, the first electrode PX having the plurality of strip portions PB may form a common electrode connected to a common signal line CL and the second electrode CT may form a pixel electrode connected to a source electrode of a thin film transistor.

In this embodiment, a chiral dopant which imparts left twisting is added to the liquid crystal layer LC. However, when the initial alignment direction Ia is inclined at the angle $\theta$ in the counterclockwise direction as viewed from a counter substrate B2 side with reference to the strip portions PB, it is needless to say that a chiral dopant which imparts right twisting may be added to the liquid crystal layer LC.

[Second Embodiment]

Figure 7:
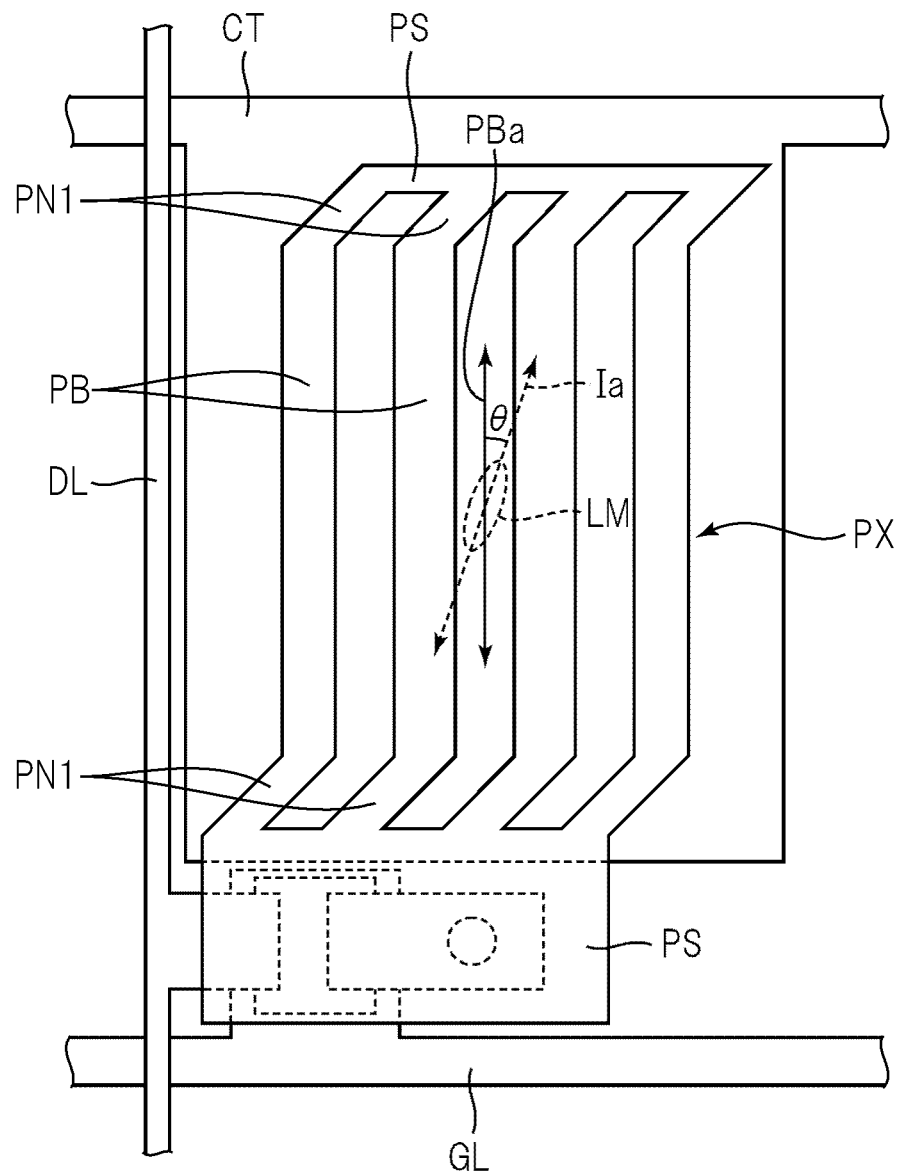
FIG. 7 is an enlarged plan view of a pixel region of a thin film transistor substrate according to a second embodiment.

Next, a liquid crystal display device according to the second embodiment of the invention is explained. FIG. 7 is an enlarged plan view of one pixel region of a thin film transistor substrate B1 according to the second embodiment. That is, in the first embodiment, the first electrode PX has a comb-teeth-shaped electrode structure where the first electrode PX has one trunk portion PS and the plurality of strip portions PB extend from one trunk portion PS. In the second embodiment, a first electrode PX has the slit-shaped electrode structure where the first electrode PX has two trunk portions PS and a plurality of strip portions PB extend between these trunk portions PS.

As shown in FIG. 7, both bent portions PN1 arranged on an upper side and lower side in the drawing are interposed between the trunk portions PS and the strip portions PB, and are arranged contiguously with the trunk portions PS and the strip portions PB. Although the liquid crystal display device according to the second embodiment differs from the liquid crystal display device according to the first embodiment with respect to such a point, the liquid crystal display device according to the second embodiment has substantially the same constitution as the liquid crystal display device according to the first embodiment with respect to points other than the above-mentioned point.

[Third Embodiment]

Figure 8:
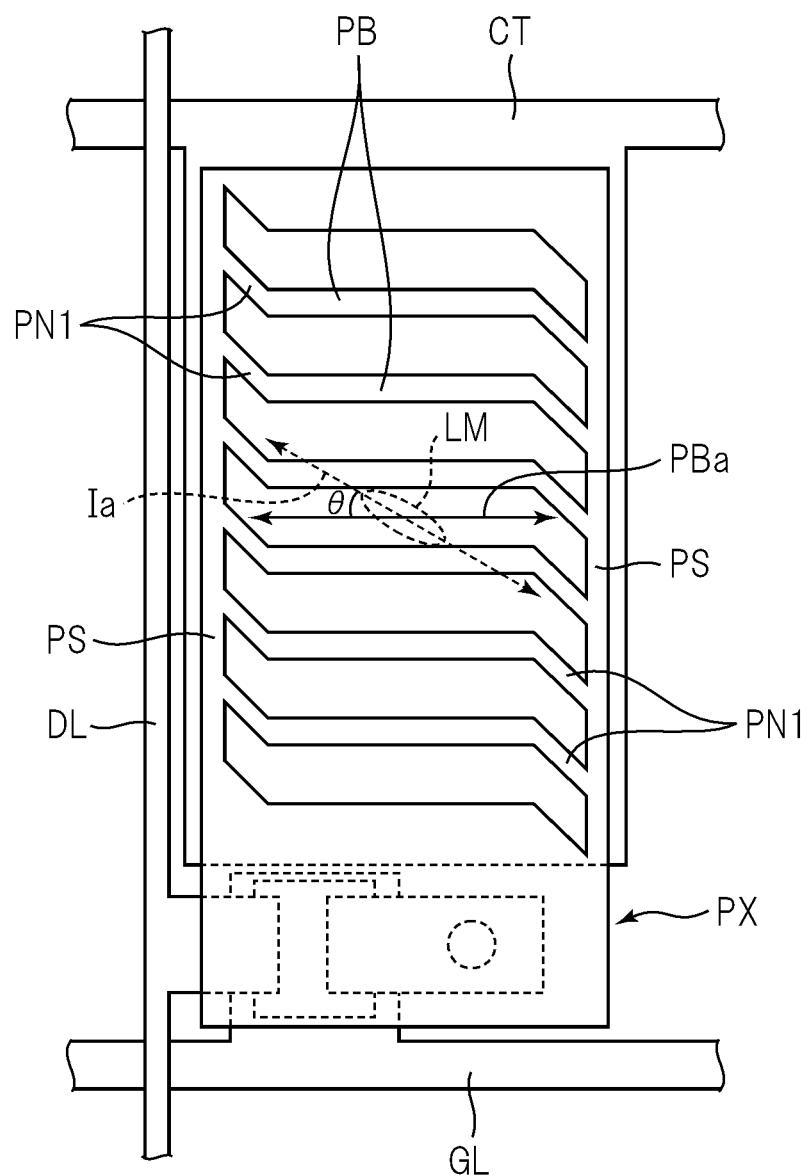
FIG. 8 is an enlarged plan view of a pixel region of a thin film transistor substrate according to a third embodiment.

Next, a liquid crystal display device according to the third embodiment of the invention is explained. FIG. 8 is an enlarged plan view of one pixel region of a thin film transistor substrate B1 according to the third embodiment. That is, in the third embodiment, a first electrode has the slit-shaped electrode structure where the first electrode PX has two trunk portions PX which extend in a direction parallel to video signal lines DL which is a longitudinal direction of a pixel region, and plurality of strip portions PB extend between two trunk portions PS.

In the third embodiment, the respective strip portions PB extend in a direction parallel to scanning signal lines GL and each strip portion PB has a straight-line shape such that the strip portion PB passes an intermediate location between two video signal lines DL arranged adjacent to each other. An initial alignment direction Ia becomes a direction which is inclined at an angle θ (0°<θ<90°) in the clockwise direction as viewed from a counter substrate B2 side with reference to a direction along which the strip portions PB extend, and a direction along which the bent portions PN1 extend is inclined at an angle φ (0°<φ<90°) in the clockwise direction with reference to the direction along which the strip portions PB extend, and the relationship between the angle θ and the angle φ is set to θ<φ. The liquid crystal display device according to the third embodiment is substantially equal to the liquid crystal display device of the first embodiment except for the above-mentioned point, and in the same manner as the first embodiment, a chiral dopant which imparts the left twisting rotation which is the counter clockwise direction as viewed from the counter substrate B2 side is added to a liquid crystal layer LC.

[Fourth Embodiment]

Next, a liquid crystal display device according to the fourth embodiment of the invention is explained. FIG. 9A is an enlarged plan view of one pixel region of a thin film transistor substrate B1 according to the fourth embodiment. That is, the liquid crystal display device according to this embodiment adopts a so-called multi-domain method.

Firstly, in the fourth embodiment, a first electrode PX has a first region D1 and a second region D2, and the first region D1 is set larger than the second region D2. The first electrode PX has a plurality of first strip portions DB1 which extend in a predetermined direction and first bent portions DN1 which extend in a direction different from the direction of the first strip portions DB1 in a bent shape in the first region D1, and a plurality of second strip portions DB2 which extend in a direction different from the direction of the first strip portions DB1 and second bent portions DN2 which extend in the same direction as the first strip portions DB1 in the second region D2. As shown in FIG. 9A, an initial alignment direction Ia in the fourth embodiment is arranged parallel to scanning signal lines GL, and the first strip portions DB1 and the second strip portions DB2 are inclined to become symmetric with each other with reference to the initial alignment direction Ia. The respective first strip portions DB1 and the respective second strip portions DB2 are formed in an extending manner from trunk portions PS separately.

FIG. 9B and FIG. 9C are views for specifically explaining the rotation of liquid crystal molecules LM shown in FIG. 9A which is the enlarged plan view. FIG. 9B corresponds to the rotation of the liquid crystal molecules LM generated by the first strip portions DB1, and FIG. 9C corresponds to the rotation of the liquid crystal molecules LM generated by the second strip portions DB2. In FIG. 9B, an initial alignment direction Ia is inclined at an angle θ (0°<θ<90) in a clockwise direction as viewed from a counter substrate B2 side with reference to a direction DB1a along which the first strip portions DB1 extend, while in FIG. 9C, the initial alignment direction Ia is inclined at an angle θ in a counterclockwise direction as viewed from the counter substrate B2 side with reference to a direction DB2a along which the second strip portions DB2 extend. Accordingly, as shown in FIG. 9B, in the first region D1, a lateral electric field is applied in a direction DB1e perpendicular to the extending direction DB1a of the first strip portions DB1 so that the right twisting rotation is induced in the liquid crystal molecules LM. As shown in FIG. 9C, in the second region D2, a lateral electric field is applied in a direction DB2e perpendicular to the extending direction DB2a of the second strip portions DB2 so that the left twisting rotation is induced in the liquid crystal molecules LM.

Also in the fourth embodiment, in the same manner as the first embodiment, a chiral dopant which imparts the left twisting rotation to a liquid crystal layer LC is added to the liquid crystal layer LC. Further, as described above, in the fourth embodiment, the first strip portions DB1 are formed in an area larger than an area where the second strip portions are formed and hence, the first region D1 where an electric field is applied by the plurality of first strip portions DB1 is set larger than the second region D2. Accordingly, transmissivity at the time of performing a white display in the first region D1 is enhanced so that transmissivity at the time of performing the white display in the whole pixel region is enhanced. In the second region D2, the rotation of the liquid crystal molecules LM in the same direction as a direction which a chiral dopant imparts is induced by a lateral electric field so that transmissivity at the time of performing a white display is lowered. However, as shown in FIG. 6, the generation of the pushed domain can be reduced.

FIG. 9D is a view for specifically explaining the rotation of liquid crystal molecules LM shown in FIG. 9A which is an enlarged plan view, and corresponds to the rotation of the liquid crystal molecules LM in the first bent portions DN1. In the fourth embodiment, in the same manner as the first embodiment, a pushed domain is liable to be generated in the first region D1. In view of the above, as described above, the first bent portions DN1 which extend from the first strip portions DB1 in a bent shape are formed. A direction DN1a along which the first bent portions DN1 extend is, as shown in FIG. 9D, inclined at an angle φ (0°<φ<90°) in a clockwise direction with reference to the direction DB1a along which the first strip portions DB1 extend. A direction DN1e of a lateral electric field generated by the bent portions DN1 makes an acute angle in a counterclockwise direction with reference to the initial alignment direction Ia. Accordingly, the direction of rotation induced by the first strip portions DB1 and the direction of the rotation induced by the first bent portion DN1 are inverted from each other.

In the fourth embodiment, the second bent portions DN2 are bent from the second strip portions DB2 and extend in the same direction as the first bent portions DN1. Accordingly, the generation of the pushed domain in the second region D2 can be further reduced.

Although the second bent portions DN2 extend in the same direction as the first bent portions DN1 in the fourth embodiment, the second bent portions DN2 may extend in a direction different from the direction along which the first bent portions DN1 extend or the second bent portions DN2 may not be formed.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
   a thin film transistor substrate;
   a counter substrate which is arranged to face the thin film transistor substrate in an opposed manner; and
   a liquid crystal layer sandwiched between the thin film transistor substrate and the counter substrate, wherein
   the thin film transistor substrate includes a first electrode and a second electrode for applying an electric field in a substrate in-plane direction, the first electrode includes a plurality of strip portions which extend in a predetermined direction, a chiral dopant which imparts the rotation in a direction opposite to a rotational direction of liquid crystal induced by an electric field applied between the strip portions and the second electrode is added to the liquid crystal layer;

the first electrode further includes bent portions which are bent from the strip portions and extend in a direction different from the predetermined direction, a direction of initial alignment direction of liquid crystal molecules in the liquid crystal layer is inclined by an angle $\theta$ ($0°<\theta<90°$) with reference to the strip portions, a direction that the bent portions extend is inclined by an angle $\phi$ ($0°<\phi<90°$) with reference to the strip portions on the same side as a side where the initial alignment direction is inclined; and the angle $\phi$ that the bent portions are inclined with reference to the strip portions is set larger than the angle $\theta$ that the initial alignment direction is inclined with reference to the strip portions.

2. The liquid crystal display device according to claim 1, wherein the first electrode further includes a trunk portion to which the plurality of strip portions are connected respectively, and the bent portions are arranged between the strip portions and the trunk portion.

3. The liquid crystal display device according to claim 1, wherein the first electrode further includes a trunk portion to which the plurality of strip portions are connected respectively, and the bent portions are arranged on edge portions of the strip portions on a side opposite to a side where the strip portions are connected to the trunk portion.

4. The liquid crystal display device according to claim 1, wherein a length that the strip portions extend in the predetermined direction is set larger than a length that the bent portions extend in the direction different from the predetermined direction.

5. The liquid crystal display device according to claim 1, wherein the strip portions of the first electrode delimit slits of the first electrode therebetween, each of the slits having a closed end and an opposite open end.

6. The liquid crystal display device according to claim 1, wherein the direction of initial alignment direction of liquid crystal molecules in the liquid crystal layer with reference to the strip portions of the first electrode is other than a direction parallel to the predetermined direction of extension of the strip portions.

7. A liquid crystal display device comprising:
a thin film transistor substrate;
a counter substrate which is arranged to face the thin film transistor substrate in an opposed manner; and
a liquid crystal layer sandwiched between the thin film transistor substrate and the counter substrate, wherein
the thin film transistor substrate includes a first electrode and a second electrode for applying an electric field in a substrate in-plane direction,
the first electrode includes a plurality of strip portions which extend in a predetermined direction,
a chiral dopant which imparts the rotation in a direction opposite to a rotational direction of liquid crystal induced by an electric field applied between the strip portions and the second electrode is added to the liquid crystal layer,
the plurality of strip portions are a plurality of first strip portions,
the first electrode includes a plurality of second strip portions which extends in a predetermined direction different from the first strip portions,
a trunk portion which is connected to the respective first strip portions and the respective second strip portions,
a direction of an initial alignment direction of liquid crystal molecules in the liquid crystal layer is inclined by an angle $\theta$ ($0°<\theta<90°$) with reference to the first strip portions,
a direction that the second strip portions extend is inclined toward a side opposite to a side that the first strip portions are inclined with reference to the initial alignment direction, and
a region to which an electric field is applied by the plurality of first strip portions and the second electrode is set larger than a region to which an electric field is applied by the plurality of second strip portions and the second electrode.

8. The liquid crystal display device according to claim 7, wherein the first electrode further includes first bent portions which are bent from the first strip portions and extend in a direction different from the predetermined direction, and
a direction that the first bent portions extend is inclined by an angle $\phi$ ($0°<\phi<90°$) with reference to the first strip portions on the same side as a side where the initial alignment direction is inclined.

* * * * *